United States Patent
Kinkade (10) Patent No.: US 6,360,329 B1
(45) Date of Patent: Mar. 19, 2002

(54) INTERVAL-TIMING FACILITY USING OVERBUILT HIERARCHICAL TIMING WHEELS

(75) Inventor: Joseph D. Kinkade, Menlo Park, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/614,219

(22) Filed: Jul. 12, 2000

Related U.S. Application Data (63) Continuation of application No. 09/153,056, filed on Sep. 15, 1998, now Pat. No. 6,115,826.
(60) Provisional application No. 60/059,068, filed on Sep. 16, 1997.

(51) Int. Cl.[7] .................................................. G06F 1/14
(52) U.S. Cl. ...................................................... 713/502
(58) Field of Search ................................. 713/500, 501, 713/502

(56) References Cited

U.S. PATENT DOCUMENTS

| 5,768,572 A | * | 6/1998 | George et al. ............... 713/502 |
| 5,838,957 A | * | 11/1998 | Rajaraman et al. .......... 713/502 |
| 6,115,826 A | * | 9/2000 | Kinkade ...................... 713/502 |

OTHER PUBLICATIONS

Varghese, et al., "Hashed and Hierarchical Timing Wheels: Data Structures for the Efficient Implementation of a Timer Facility," ACM, 1987, pp. 25–38.

* cited by examiner

Primary Examiner—Dennis M. Butler
(74) Attorney, Agent, or Firm—Leah Sherry; Oppenheimer Wolff & Donnelly

(57) ABSTRACT

A system for timing intervals in a computer. The system provides an interval timing service for processes running in a computer system. The timing service supports a potentially large number of interval timers by using "timing wheels" that "turn" at different periods. The time base for the fastest turning wheel can be an interrupt event or some other hardware or software control.

13 Claims, 4 Drawing Sheets

Flowchart of Timer Start Function

Flowchart of Timer Start Function

FIG. 1

Flowchart of Timer Stop Function

FIG. 2

Flowchart of Timer Interrupt Processing

INTERVAL-TIMING FACILITY USING OVERBUILT HIERARCHICAL TIMING WHEELS

CROSS-REFERENCES TO PRIOR APPLICATIONS

This application is a continuation of U.S. patent application Ser. No. 09/153,056 filed Sep. 15, 1998, now U.S. Pat. No. 6,115,826, which claims the benefit of Provisional Patent Application Ser. No. 60/059,068, filed Sep. 16, 1997 which are incorporated by reference as if set forth in full in this document.

BACKGROUND OF THE INVENTION

This invention relates in general to the timing of intervals in a computer and more specifically to a system providing an interval timing service for processes running in a computer system.

Different types of interval timers can be found in alarm clocks, egg timers, or timers in VCRs. Interval timers are used to cause an alarm or other pre-determined action to occur after a pre-specified amount of time. Within computer systems, interval timers are used in communications over networks, such as for re-transmitting a packet of communications data when a response does not arrive within the expected amount of time. Interval timers are also used in interactions with hardware devices, for error detection and handling, for detecting and handling failures within fault-tolerant systems, for pacing the rate at which displays are updated, in interactions with human beings, for dividing "CPU time" equitably among computer processes, and for a wide variety of other uses.

Some computer systems require the maintenance, or scheduling, of many events that are controlled by an interval timer or timers. Various schemes have been adopted to improve the efficiency of such timers and scheduling because the processing overhead required to update the timers and handle the events can become significant and degrade the ability of the computer to handle other tasks. An example of an approach to handling multiple timers is described in a paper by G. Varghese and T. Lauck entitled "Hashed and Hierarchical Timing Wheels: Data Structures for the Efficient Implementation of a Timer Facility," Proceedings of the Eleventh ACM Symposium on Operating System Principles, 8–11 November 1987, Operating System Review 21 (5), ACM Press, 1987, ISBN 0-89791-242-X.

The system described by Varghese and Lauck, places emphasis on a "Timer Start" function. In accordance with Varghese and Lauck the timing method can be described by use of a hierarchy of timing wheels using "hours" "minutes" and "seconds" wheels to time delays of up to 24 hours with one-second resolution. This could be part of a larger hierarchy of timing wheels, allowing timing, for example, for up to 16 weeks.

For example, Varghese and Lauck consider the case where the current time is 10:24:30 and an interval of 50 minutes and 45 seconds is to be timed.

In the following:

curTime is the current time, or some regularly updated similar value. Since we are only interested in measuring intervals of time, curTime need not be the same as the true current time, it only needs to be advancing at the same rate. Also, it need not be directly updated by timing hardware, but it must be possible to access the timing hardware in order to learn the correct value for curTime.

timeoutValue is the specified amount of time to elapse before the timer expires.

expirationTime is the time at which the timer is to expire, if not previously canceled. That is, the timer expires when curTime becomes equal to expirationTime.

The method for Timer Start is one of first computing the expiration time, and then enqueuing (chaining) the timer on the most-significant wheel for which the expiration time differs from the current time:

| | |
|---|---|
| curTime is | 10:24:30 |
| timeoutValue is | 00:50:45 |
| expirationTime is | 11:15:15 |

According to this prior method, the timer will be chained on the hours wheel in slot 11. This happens because expirationTime differs from curTime in the hours position, and the hours portion of expirationTime is 11.

Then, if the client doesn't cancel the timer, at 11:00:00 the timer will be moved to slot 15 of the minutes wheel. At 11:15:00, the timer is moved again, to slot 15 of the seconds wheel. The timer finally expires at 11:15:15 and is no longer on any slot of any timing wheel, until it's re-used to time another interval of time.

Although Varghese and Lauck describe a relatively efficient timer processing mechanism, it is desirable to provide a timer system that further reduces the processing required by a computer to operate and maintain the timers.

SUMMARY OF THE INVENTION

The present invention provides a timer system that uses less computer time than previous processes and methods, leaving more computer time available to do other work. Multiple timing wheels are maintained with slots associated with each wheel. In one embodiment, a process, event, or other item that needs to be timed is scheduled on a slot on a timing wheel according to the timeout value of the item. In another embodiment, the wheels have a maximum timeout value associated with them. The maximum timeout value is used to schedule the item. In another embodiment, the maximum timeout value for a wheel is increased to be an integral multiple of the period of the wheel before scheduling according to the maximum timeout value is performed.

DESCRIPTION OF THE SPECIFIC EMBODIMENTS

A process using a timer such as offered by the service can set the timer to expire after some interval of time and cause a pre-specified action to occur.

The interval of time to elapse before expiration of a timer can be any amount of time chosen by the process, subject to the constraints that the interval of time is expressed as some integral number of "timer ticks" or units from one timer tick up to some maximum number of timer ticks.

In one embodiment of the invention, the size of a "timer tick" is 0.01 seconds (one hundredth of a second), and the delay before the expiration of a timer can range from 1 timer tick (0.01 seconds or 10 milliseconds) up to 2,147,483,647 timer ticks (i.e. 21,474,836.47 seconds, or approximately 248 days).

The delay before expiration of a timer can be chosen independently of the delay before expiration of any other timer.

The process can choose the delay time for a timer at any time before starting the timer. The choice is not restricted by considerations such as how long the delay time was for any previous use of the timer.

The process using the timer can stop or cancel the timer. If the process stops the timer before it expires, then the pre-specified action for the expiration of the timer will not occur. When a process stops the timer, the process can learn whether or not the timer expired. If the timer didn't expire before the process stopped it, then the process can learn how much time (how many timer ticks) remained before the timer would have expired.

A process typically uses timers by associating a timer with each of a number of events, where each event is expected to occur within a predetermined amount of time. For example, the process may have sent a packet over a network, and may expect to receive an acknowledgment of receipt of the packet within some amount of time. When the response to the packet is received, the process would typically cancel the timer.

Another typical use of a timer is to cause an action to be performed periodically, such as at one-minute intervals.

An application can use one timer to time several operations or events. For example, a process awaiting responses for several outstanding packets might use a single timer, always set to expire at the "due time" for the response that is due the soonest.

While one or more timers are running the process using the timers can perform a variety of other work. The process may "sleep" while awaiting either the expiration of a timer or the arrival of more work.

One special use of a timer is to limit the amount of time that a process will "sleep" or suspend execution while waiting to be "woken" (to resume execution).

The timing service or facility keeps track of interval timers that are in use and how much time remains before the expiration time of each timer. The timing service causes the pre-specified expiration processing to occur for each timer that expires.

The user of the timing service invokes the timing service by calling one of two sub-routines or functions provided by the interval-timing service:

A Timer Start function, to start the timer

A Timer Stop function, to stop the timer

Each timer is implemented as a data structure in memory called a Timer List Element or TLE. The number of timers is in principal limited only by the amount of globally addressable resident memory.

Depending on the needs of the users of timing services, there may be various types of timers, and thus various types of TLE. For example, the user of timing services may require different processing when the timer expires, and the different types of processing may require different types of data.

In one implementation of the invention, some types of timers are limited in number, and are allocated from a table of Time List Elements while other types of timers could reside anywhere in globally addressable resident memory.

The Timer List Element (TLE) data structure contains some data fields that are common to all types of TLE. These fields support the operations that are common to all types of TLE, including the "Timer Start" and "Timer Stop" functions. These fields also enable the timing services to distinguish between the various types of TLE and the various kinds of expiration processing.

In addition to the common fields of the TLE, different types of TLE may contain different kinds and amounts of data, as needed to support different kinds of expiration processing or to support other differences in operations that can be performed on the various kinds of timers.

There is a set of data structures in memory that is owned by and private to the timing service, and which provides list anchors for keeping track of the timers being timed. This set of data structures also includes other data that is private and internal to the timing service.

In a uni-processor system, there is one set of such data structures per processor or CPU.

In a shared-memory multi-processor (SMP) system, there would be one set of such structures for each combination of a memory and its associated processors. For example, in a 4-way SMP system, the TLEs would not be associated with any particular processor, and the 4 processors would share a single set of timing-service data structures.

In a loosely-coupled clustered system, where each process using the timer service is executing in a particular node of the cluster and each node has its own memory, there is one set of timing-service data structures per node.

When a process using the timing facility starts a timer, the process specifies the action to be taken if the timer expires.

If the timer expires, the timing service must cause the pre-specified action to happen.

For example, the pre-specified action to be taken when a timer expires may be any of:

to wake a "sleeping" process to queue the timer on a list of expired timers for the process and to wake the process if the process is sleeping to perform periodically-performed processing specific to the particular timer or to the type of timer, and then to restart the timer.

Depending on the type of processing required at expiration time, and on the type of data needed to perform that processing, there may be different types of timer data structures, with varying amounts and types of data fields.

In one implementation of the invention, the type of timer and the desired processing to be performed if the timer expires are encoded in a "TLE type" field in the "TLE" data structure for the timer. In this implementation different types of timers have different numeric values stored in their "TLE type" fields.

In an alternative implementation of the invention, the type of timer and the desired processing to be performed if the timer expires might be encoded by replacing the "TLE type field" with a "function pointer" field containing the address of a sub-routine or function to perform whatever expiration-time processing is specific to the particular type of timer. This approach is called using a "call-back function" pointer, and is typical of methods used by many programmers programming in the "C" programming language.

In another possible implementation of the invention, the "TLE type" field could be replaced with the address of a "virtual function table." This approach is typical of programming in the C++ programming language. In this approach, all timers of a particular type might use the same virtual function table. The virtual function table for a particular type of timer would contain a pointer to the particular function to perform the "timer expiration" processing specific to the particular type of timer. It might also contain other function pointers, for other possible functions, but this is not relevant to the invention.

There are also many other variations possible, with various advantages and disadvantages. The differences between them are not relevant to the invention, since the new and non-obvious aspects of the invention are not in this aspect of the invention.

Hardware Clock

The timing service of the invention uses a hardware clock or timer.

The timing service may use the hardware clock or timer directly, or it may use some simple lower-level timing service that provides equivalent functionality to the direct use of a hardware clock or timer, and which itself is based on use of a hardware clock or timer.

The timing service uses a single hardware clock or timer to provide timing services for a potentially very large number of application programs or processes each of which may use a large number of interval timers.

In the simplest case, the hardware clock or timer is used to cause an interrupt once per "timer tick," and the timing service is invoked by an asynchronous interrupt mechanism once per timer tick.

In a more complicated case, the timing service may be able to program the hardware clock/timer to skip some interrupts if it can be determined in advance that nothing of interest is scheduled to happen for the next few timer ticks, and if the hardware clock/timer can be programmed to cause interrupts at specific times. In this case, if a process using the timing service starts a timer that is set to expire within the time interval that the hardware timer was set to skip over, then the timing service must re-program the hardware timer to cause an interrupt no later than the expiration time of the timer that is set to expire soonest.

Illustration of "Hierarchical Timing Wheels"

The timing facility of the invention provides interval-timing services by the use of two or more "timing wheels" forming a hierarchy of timing wheels, with each timing wheel containing at least two "slots." Each slot contains a list anchor that is used to maintain an ordered list of all the timers currently chained on this slot. Although it is possible to merely have a single slot per timer, the use of two (or more) slots reduces the number of timing wheels required. It is also possible to replace the list anchor (also called a "chain anchor") of a slot with some other data structure for keeping track of the timers in a slot.

Each timing wheel may be considered as providing a partial timing service in terms of a larger unit of time. This is analogous to the way in which the hands of a clock work together, with the "seconds" hand, the "minutes" hand, and the "hours" hand providing timing in a series of units of time. Another analogy is to the wheels of a mechanical digital clock. For example, a digital clock might have an "hours" wheel, a "minutes" wheel, and a "seconds" wheel. Or, a mechanical digital clock might have an "a.m./p.m." wheel, an "hours" wheel, a "10-minutes" wheel, a "minutes" wheel, a "10-seconds" wheel" and a "seconds" wheel.

Illustration of "Timer Start" Function

Features of the present invention include
an improved process for the "Timer Start" function
an improved data structure for the timing wheels themselves
corresponding changes in the "per-tick" processing invoked by hardware timer/clock interrupts The method and process of moving timers from one wheel to another and of timing out timers that have expired is performed by the interrupt-driven part of the timing facility.

The overall method for processing a "timer tick" is shown in Table I, below:

1. Increment curTime.
2. Process the seconds wheel.
3. If the seconds wheel advanced to zero, then process the minutes wheel.
4. If the seconds wheel and minutes wheel both advanced to 0, then also process the minutes wheel.
5. If there were more wheels, then we would continue, such as with "days" and "weeks" wheels, processing each wheel if all earlier wheels had advanced to 0.

Table I

The method for processing a wheel is to process the slot whose number matches the part of curTime corresponding to this wheel. For example, for the minutes wheel, the slot number is given by minutes part of the time.

The method for processing a slot is to remove all the timers chained from that slot, in the same order as they were inserted on the list, and to move or perform expiration processing for each timer take from the slot.

The method for moving or performing expiration processing for a timer that has been removed from a slot is shown in Table II, below:

1. Re-compute the timer's timeoutValue as the difference between the timer's expirationTime and the current value of curTime.
2. If the new timeoutValue is 0, then perform the timer-expiration processing for the particular type of timer.
3. If the new timeoutValue is non-zero, then the timer can be re-enqueued on some slot of some timer wheel by re-applying the Timer Start method, using the new value of timeoutValue.

Table II

Many equivalent variations on the above are possible. For example, it would be possible to write more efficient code to move a timer from one timing wheel to another, getting the same result as by computing a new timeoutValue value and using the Timer Start method, but with fewer computer instructions. In the preferred embodiment this was not done, because the most timers are canceled and don't need to be moved from one timing wheel to another.

Improvement 1

The first improvement is to use timeoutValue instead of expirationTime to choose the wheel, while continuing to use expirationTime to choose the slot within the wheel.

With Improvement 1, each timing wheel, starting with the "fastest turning" wheel, handles timers for time-out values up to some maximum time-out value. The maximum time-out value for a wheel can be computed as the period of the wheel, the amount of time it takes the wheel to complete one full cycle and return to its starting position.

In the above example:

| | | |
|---|---|---|
| use "seconds" wheel | if timeoutValue < | 60 seconds |
| use "minutes" wheel | if timeoutValue < | 60 minutes |
| use "hours" wheel | if timeoutValue < | 24 hours |

This method can be implemented in several ways.

One implementation of the invention uses a table of maximum time-out values. The table is implemented as an array of values in computer memory, with the "fastest-turning" wheel considered as wheel 0. The maximum time-out value for the "fastest-turning" wheel is stored in the first element (element 0) of the table, the maximum time-out value for the next wheel is stored in element 1, and so on.

In our example, if times were expressed in seconds, the table of maximum time-out values would contain entries as follows:

| Which element? | Contents of element. |
|---|---|
| element[0] | 59 |
| element[1] | 3,599 |
| element[2] | 86,399 |

The maximum time-out value for each wheel is the amount of time that it takes for the wheel to cycle through one turn or revolution, such as 60 seconds for the seconds wheel, minus one timer tick. In our example so far, the amount of time it takes for the timer to cycle through one turn is the same as the amount of time for the next wheel to advance by one slot.

(It is also possible to use a variation of this method in which the maximum time-out value for each wheel is simply the amount of time that it takes for the wheel to cycle through one turn or revolution, such as 60 seconds for the seconds wheel, without subtracting one timer tick. Such a variation introduces avoidable complications for little benefit.)

To illustrate the improved method, we will now apply it to the previous example:

| | |
|---|---|
| curTime is | 10:24:30 |
| timeoutValue is | 00:50:45 |
| expirationTime is | 11:15:15 |

Using the previously known method, the timer would be chained on slot 11 of the hours wheel, because expirationTime differs from curTime in the hours position and the hours portion of expirationTime is 11.

Using the improved method, the timer will be chained on slot 15 of the 20 minutes wheel. The minutes wheel is chosen because timeoutValue is more than 59 seconds but less than 60 minutes. Slot 15 is chosen because the minutes portion of expirationTime is 15.

After the timer is chained on slot 15 of the minutes wheel, then (assuming the timer hasn't been canceled) the timer will be processed again at 11:15:00 when it will be moved to slot 15 of the seconds wheel. Subsequent processing of the timer will results in the same movement from slot to slot as for the previously known method.

Compared to the previously known method, the improved method results in avoiding the processing at 11:00:00, so it can avoid one processing step.

There are some combinations of current time and time-out value for which the improved method chooses the same slot on the same wheel as the previously-known method. There are also some rare combinations of current time and time-out value for which the improved method chooses a slot and wheel in a way that can save more than one processing step. There are no cases in which the improved method chooses a slot and wheel in a way that can take more processing steps. Overall, the improved method always chooses at least as good a slot as the previously-known method chooses, and the improved method often chooses a better slot.

The processing step that is avoided would have come early in the sequence of processing for the timer, so the processing step that is avoided is the step that was most likely to happen. Later processing steps are less likely to happen, because by then the chance that the timer will have been canceled is higher.

The improved method of choosing the slot has a tendency to avoid putting timers in slots that are about to be emptied. This applies particularly to slots in the timer wheels that "turn" or advance through the slots more slowly. There is a tendency to put timers on slots of faster-turning wheels instead, but in a slot that will not be processed until a later time than the time at which the slot of the slower-turning wheel would be processed.

There are two advantages to Improvement 1.
1. It gives a better choice of wheel and slot, reducing the need to examine or process the timer after the timer has been assigned to a slot.
2. It typically chooses the slot more cheaply, in that it typically uses less computer time than the previously know method. The savings come partly from the fact that the improved method considers the "faster" wheels first, and these are typically the wheels that the timer is more likely to be queued on. The savings also come partly from the fact that the processing required to consider using a wheel requires fewer instructions than the previous method.

Improvement 2 Variation A

Improvement 1 chooses the wheel by comparing the time-out value with some maximum time-out value for each wheel instead of by choosing the slowest-turing wheel for which the expiration time differs from the current time. Improvement 2 further improves Improvement 1.

In improvement 1 it was assumed that each slower-turning timing wheel would step one slot for each full cycle of its faster-turning neighbor wheel, as in the previously known method for using hierarchical timing wheels. Accordingly, the maximum time-out value for each wheel can be described as one timer tick less than either the amount of time it takes for this wheel to complete one full cycle or the amount of time that it takes for the next wheel to advance by one slot. Either description was applicable because the two times were equal.

Improvement 2 preserves the advantages of Improvement 1, but also avoids certain unfortunate cases. Improvement 2 results from changing the assumed properties of the relationship between timing wheels.

There are two variations of improvement 2. In variation A, the wheels are built differently. In variation B, the wheels are built the same, but they are treated partly as if they were built differently. These variations can be called "over-built" timing wheels and "virtually over-built" timing wheels.

The first method, Variation A, consists of arranging that, instead of a wheel containing as many slots as are needed to handle one "tick" of the next wheel, it will contain some multiple of that number of slots. The maximum time-out value for each wheel is increased (compared to the previously known method) to reflect the fact that the wheel is built with more slots. For example, a "seconds" wheel may be built with 120 slots instead of 60 slots.

For example, if we assume timing for up to 24 hours with an hours wheel, a minutes wheel, and seconds wheel, the previous method would have used a hierarchy of wheels built as shown in Table III as follows:

TABLE III

| wheel: | seconds | minutes | hours |
|---|---|---|---|
| time for this wheel to advance one slot: | 1 second | 60 seconds | 3,600 seconds |
| time for next wheel to advance one slot: | 60 seconds | 3,600 seconds | 86,400 seconds (24 hours) |
| slots to build for this wheel: | 60 slots | 60 slots | 24 slots |
| maximum time-out value for this wheel: | 59 seconds | 3,599 seconds | 86,399 seconds |

Variation A will be illustrated by the same assumptions, plus the assumption that each wheel is "over-built" by a factor of 2. That is, the number of slots per wheel and the maximum time-out value for each wheel are increased by a factor of 2. The hierarchy of wheels is built as shown in Table IV as follows:

TABLE IV

| wheel: | seconds | minutes | hours |
|---|---|---|---|
| time for this wheel to advance one slot: | 1 second | 60 seconds | 3,600 seconds |
| time for next wheel to advance one slot: | 60 seconds | 3,600 seconds | 86,400 seconds (24 hours) |
| slots to build for this wheel: | 120 slots | 120 slots | 48 slots * |
| maximum time-out value for this wheel: | 119 seconds | 7,199 seconds | 172,799 seconds * |

It isn't necessary to increase the number of slots in the last wheel, but it makes processing of the wheels uniform.

The advantage of Variation A is that it works better for certain "unlucky cases" in which a timer would otherwise be assigned to a slot that is going to be processed very soon.

The example used so far isn't an unlucky one. However, the example shown below is an "unlucky case."

| | |
|---|---|
| curTime is | 10:58:59 |
| timeoutValue is | 61:00 |
| expirationTime is | 11:59:59 |

If we weren't using an "overbuilt" wheel, then we would put the timer on slot 11 of the hours wheel. The minutes wheel will not be used because timeoutValue is more than 60 minutes. This would occur whether we were using the previously known method, or using the method of "Improvement One". In this unlucky combination of curTime and timeoutValue values, the resulting slot is due to be emptied in just over a minute from now, at 11:00:00, even though the timer isn't scheduled to expire until more than an hour from now.

Using Variation 2A, the minutes wheel has 120 slots, and the timer will go onto slot 119 of the minutes wheel. In choosing the slot of the minutes wheel, it is necessary to treat it as if the next wheel were a two-hours wheel, rather than a one-hours wheel. That is, for purposes of extracting the slot number, we must break expirationTime down into 120-minute periods rather than 60-minute periods.

What has been informally described as extracting the seconds portion, minutes portion, or hours portion of expirationTime can be described more rigorously as:

1. Assume time T, expressed in seconds.
2. The seconds portion, S, of time T is T mod 60. T mod 60 is the remainder from integer division of T by 60.
3. The minutes portion, M, is (T/60) mod 60. M is the result of first taking the integer quotient of T divided by 60, and then taking the remainder from integer division of the result by 60.
4. The hours portion, H, is (T/3600) mod 24. H is the result of first taking the integer quotient of T divided by 3600, and then taking the remainder from integer division of the result by 24. (The final step isn't always necessary. If the time is for less than 24 hours, then the time divided by 3600 will be less than 24.)

In the above, a slot was always calculated according to a formula of the form (T/X) mod Y For example, to get the formula for seconds, X=1 and Y=60.

For Improvement 2, we multiply the number of slots per wheel by 2, and we double the value of Y in each formula for choosing the slot.

Returning to our example we see that since expirationTime is 11:59:59, T=43,119. The revised formula for the minutes portion is M=(T/60 is 719. 719 mod 120 is 119, so the timer goes onto slot 119.

After the timer is placed on slot 119 of the minutes wheel, it won't be processed again until either time advances to 11:59:00 or the timer is canceled. For typical applications, the timer is likely to be canceled before it expires, so it's not likely to require any further processing other than the cancellation processing.

With variation 2A, a timer is never placed on a slot that will require processing until at least half of the timer's time-out value has elapsed.

With ordinary hierarchical timing wheels, even with Improvement 1, there are always some combinations of curTime and timeoutValue that are "unlucky" in that the timer will be placed in a slot that will be processed in a small fraction of timeoutValue.

Variation 2A has the advantage that it complicates improvement 1 only in requiring that the timing wheels and the numeric values for finding choosing the wheel and slot be changed. After initialization, the method of Improvement 2A can be identical to the method of Improvement 1, so the improved worst-case handling doesn't require any extra instructions in the computer program. It does use more memory, and may also make heavier use of the hardware cache for recently-referenced memory.

Improvement 2, Variation B

Variation B of Improvement 2 (variation 2B) achieves an improvement in "unlucky case" behavior that is almost as good as variation 2A, without actually increasing the size of the wheels.

Variation 2B uses the same timing-wheel structure as with Improvement 1. Instead of changing the timing wheels, it changes the way the timing wheels are used.

In variation 2B, the maximum time-out value for a wheel is increased to be some integral multiple of the period of the wheel, the same as for variation 2A, but the number of slots for the wheel is not increased; there are still only enough slots so that the wheel cycles in the same amount of time as it takes for the next wheel to advance by one slot.

If the time-out value for a timer is less than or equal to the period of the wheel, then the slot number within the wheel is chosen the same as for Improvement 1: the portion of the expirationTime value corresponding to the particular wheel is used as the slot number. For example, when enqueuing the timer onto the minutes wheel, the minutes portion of expirationTime is used.

If the time-out value for a timer is more than the period of the wheel, then the slot number within the wheel is chosen by extracting the portion of curTime (rather than expirationTime) corresponding to the wheel.

Using the "unlucky" example again:

| curTime is | 10:58:59 |
|---|---|
| timeoutValue is | 61:00 |
| expirationTime is | 11:59:59 |

Assuming a multiplier of 2, the maximum time-out value for the minutes wheel is one timer tick less than twice the period of the minutes wheel, so the maximum time-out value for the minutes wheel is one timer tick less than 120 minutes. Accordingly, since timeoutValue is less than 120 minutes but more than 60 minutes, the timer will be assigned to the minutes wheel. The slot will by chosen by extracting the minutes portion of curTime. The resulting slot number is 58.

After the timer is place on slot 58 of the minutes wheel, it won't be processed again until 11:58:00. At that time, an updated value of timeoutValue will be computed by subtracting curTime from expirationTime. The result (11:59:59–11:58:00) will be 00:01:59, or 119 seconds. Accordingly, the timer will be placed on the seconds wheel, again using curTime to find the slot. Accordingly, it will go onto slot 0 of the seconds wheel.

The timer will be processed again at 11:59:00. The new timeoutValue will be 11:59:59–11:59:00, or 59 seconds. Since this is less than 60 seconds, it will now be placed on the seconds wheel in the ordinary way, using expirationTime. Accordingly, it will be placed on slot 59 of the seconds wheel. It will finally expire at 11:59:59.

All the preceding assumes that the process using the timer doesn't cancel it. As with variation 2A, the biggest benefits come in an environment where the timer is likely to be canceled. For example, if the timer were canceled after 45 minutes, then the only operations performed on the timer would be enqueuing the timer on slot 58 of the minutes wheel, and then deleting it from there 45 minutes later.

Like Variation A, Variation B ensures that no timer is ever placed on a slot that will require processing until at least half of the timer's time-out value has elapsed.

Compared to Variation A, Variation B has the disadvantage that it sometimes produces more processing steps. Also, the program code to choose a slot is complicated by the need to decide whether to use expirationTime or curTime.

The advantage of Variation B over Variation A is that it uses less memory for the timing wheels.

A specific embodiment of the invention provides interval timers with a resolution of a hundredth of a second (0.01 seconds). This amount of time is referred to as a timer tick or timer unit.

The smallest supported time-out value is 1 timer tick (0.01 seconds). The largest supported time-out value is 2,147,483,647 timer ticks, or approximately 248 days.

Time-out values are expressed as positive 32-bit binary integers. Time-out values less than or equal to zero or greater than 2,147,483,647 are assigned special meanings not relevant to the invention, or are illegal, depending on the value and the context.

The use of timing-wheels is not visible to the clients of the timing services, except that their calls to start a timer or to stop a timer are generally faster.

There is an ordering guarantee to compensate for the limited resolution of the timers.

Due to the limited resolution of the timers, two timers started in succession with the same time-out value could have identical expiration times. In this case, the timer that was started first is guaranteed to finish first.

In order to provide this ordering, the timing facility maintains the chains of TLEs for each slot as ordered lists. The timer inserted first is always processed first.

For convenience of a computer implementation, the number of slots per timing wheel is always a power of 2. This allows the use of binary shifting and bit-wise AND operations instead of integer division and remainder operations.

There are 7 timing wheels, used according to "Improvement 2, Variation A" of the invention. The timing wheels are "over-built" by a factor of two.

The maximum time-out value of 2,147,483,647 timer ticks is equivalent to a binary number consisting of 31 consecutive ones, or the hexadecimal number 0x7FFFFFFF. The hierarchy of timing wheels was designed by dividing these 31 bits into 7 fields, each of which is "handled" by one timing wheel.

Pictorially, a time-out value can be considered as shown in Table V.

TABLE V

| wheel: | 6 | 5 | 4 | 3 | 2 | 1 | 0 |
|---|---|---|---|---|---|---|---|
| bits: | 3 | 4 | 4 | 4 | 5 | 5 | 6 |

The seven timing wheels are numbered from 0 (the fastest-turning wheel, which handles the least-significant bits) to 6 (the slowest-turning wheel, which handles the most-significant bits).

In Table VI, "$H_{13}$ bits"refers to the number of bits handled by each wheel; $B_{13}$ bits refers to the number of bits each wheel is built to handle, due to the fact that each wheel is over-built by a factor of two. Table VI also shows the number of slots for each wheel, and the number of timer ticks that it takes to step the wheel by one slot, labeled as ticks/slot.

TABLE VI

| wheel | H_bits | B_bits | slots | ticks/slot |
|---|---|---|---|---|
| 0 | 6 | 7 | 128 | 1 |
| 1 | 5 | 6 | 64 | $64 = 2^6$ |
| 2 | 5 | 6 | 64 | $2,048 = 2^{(6+5)}$ |
| 3 | 4 | 5 | 32 | $65,536 = 2^{(6+5+5)}$ |
| 4 | 4 | 5 | 32 | $1,048,576 = 2^{(6+5+5+4)}$ |
| 5 | 4 | 5 | 32 | $16,777,216 = 2^{(6+5+5+4+4)}$ |
| 6 | 3 | 4 | 16 | $268,435,456 = 2^{(6+5+5+4+4+4)}$ |

As can be seen in VI, $B_{13}$ bits is always equal to ($H_{13}$ bits+1) for any wheel.

The number of timer ticks per step of one slot for any wheel is always 2 raised to the Xth power, where X is the sum of the $H_{13}$ bits values For example, for wheel 2, the sum of the previous $H_{13}$ bits values is (6+5), so ticks/slot is $2^{(6+5)}$, or 2 to the $_{11}$th power (2^11), or 2,048.

The earlier, faster-turning wheels are built a little bigger than the slower-turning wheels. This is done in the knowledge that almost all time-out values will be handled by wheels 0, 1, and 2. For example, it would be very unusual for a client to allow more than 655.36 seconds (more than 10 minutes) for an I/O operation to complete or for an acknowledgment of a network packet to arrive. Since the later wheels are rarely used, they are built more cheaply, using less memory space.

In the Timer Start function, the choice of timing wheel is made by use of a table of maximum time-out values for each wheel. Having chosen the timing wheel, the slot within the wheel is made by computing the expiration time (expirationTime) of the timer, then shifting it right by some number of bits and then ANDing the resulting value with a mask.

For each wheel the maximum time-out value (maxTOV) value stored in the table is one timer tick less than the ticks/slot value multiplied by the number of slots per wheel. For the last wheel, the maximum time-out value should be at least as large as the maximum legitimate time-out value.

The "shift" value is the number of bits to right-shift to get the same result as dividing by "ticks/slot." For example, shifting right by 11 bits is the same as dividing by 2048.

The "mask" value for any wheel always consists of some number of consecutive b 1bits. The number of consecutive 1 bits is the same as $B_{13}$ bits. The mask value can also be derived by subtracting 1 from the number of slots in the wheel.

The maxTOV, shift, and mask values for each wheel are thus as shown in Table VII.

TABLE VII

| wheel | maxTOV | shift | mask |
|---|---|---|---|
| 0 | 127 | 0 | 127 |
| 1 | 4,095 | 6 | 63 |
| 2 | 131,071 | 11 | 63 |
| 3 | 2,097,151 | 16 | 31 |
| 4 | 33,554,431 | 20 | 31 |
| 5 | 536,870,911 | 24 | 31 |
| 6 | 4,294,967,295 | 28 | 15 |

Timer List Elements

Each interval timer is represented in memory by a Timer List Element (TLE) data structure with fields as in the following VIII:

TABLE VIII

| name | # of bits | purpose, how used |
|---|---|---|
| next, tlink[0] | 32 | pointer to next TLE on list |
| prev, tlink[1] | 32 | pointer to previous TLE on list |
| tletoval | 32 | time-out value if the TLE is not chained on a slot; expiration time if the TLE is chained onto a slot. |
| tleid | 16 | used for some types of TLE to identify a specific timer |
| tleparm1 | 16 | "parameter" whose use varies |
| tleparm2 | 32 | another "parameter" whose use varies |
| tlequeued | 1 | set to 1 if timer has expired and the TLE has been placed on a queue of TLEs that have expired, to be processed by a specific process |
| tletype | 5 | type of TLE, used by timer expiration processing |
| tleOnList | 1 | set to 1 if the TLE is on a timing wheel |
| tleInUse | 1 | used for TLEs that are allocated from a table, to mark a TLE that has been allocated |
| | 8 | unused, pads to 64-bit boundary |

The only fields that are directly relevant to the invention are the two list pointers ("next" and "prev," also called tlink[0] and tlink[1]), the tletoval field, and the tleOnList bit.

The tleOnList bit isn't necessary, but it's used as a convenience, to help detect or prevent accidental damage to the data structures.

The remaining fields are mostly used to specify the action to be taken if the timer expires. Some fields are also used for as allocating a TLE from a table of TLEs.

Alignment with Respect to Memory Cache Lines

Because of the importance of memory cache for determining performance, several parts of the data structures are aligned to reduce the number of times a cache line must be loaded from memory.

However, optimization of data structures with regard to memory cache lines is obvious to one skilled in the art, so the details will not be described here.

Processes and Methods

The processes are diagrammed in the flow charts.

Timer Start

Figure 1:
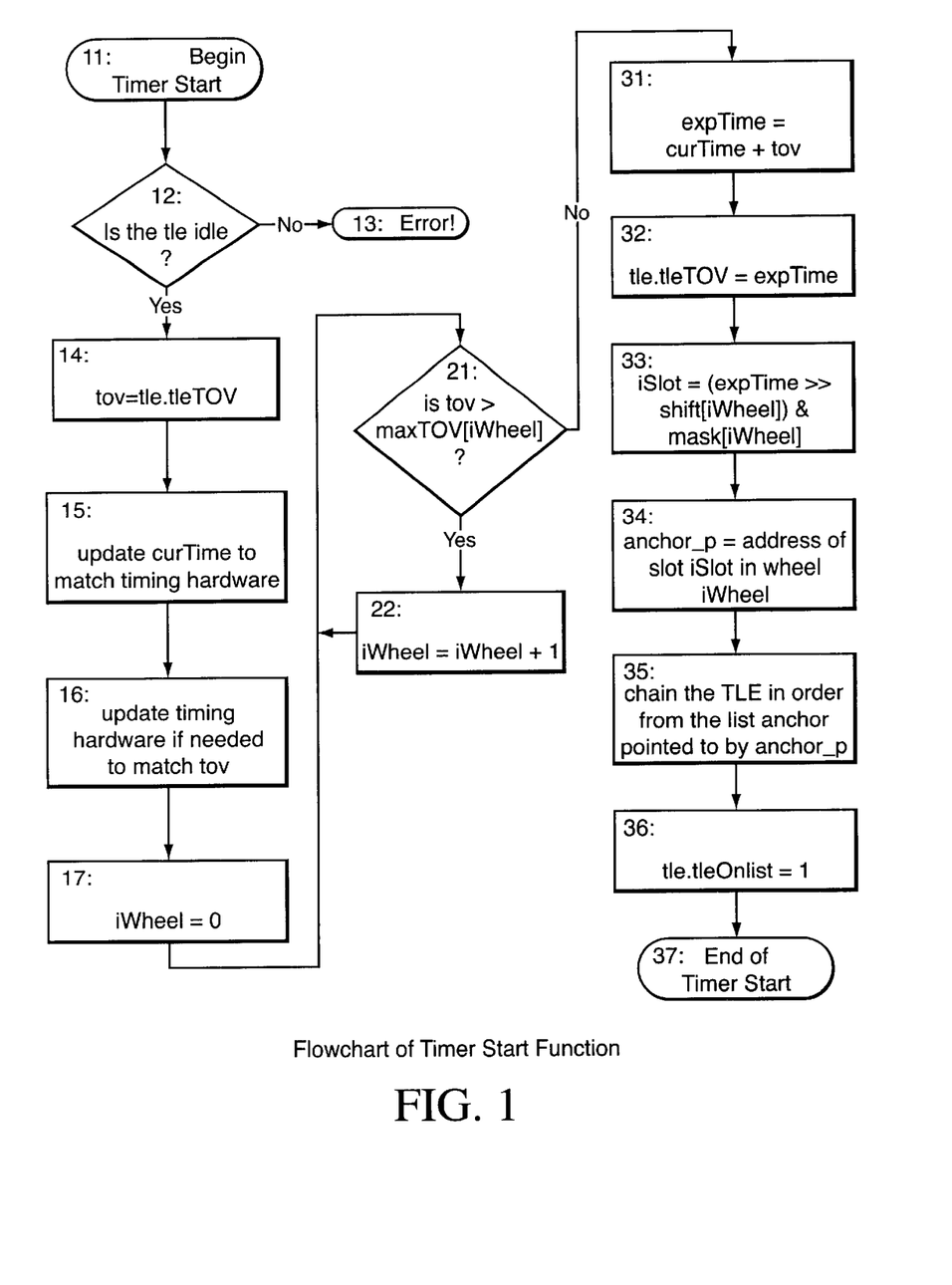
FIG. 1 is a diagram of a flowchart showing the steps of the Timer Start function.

The Timer Start function is diagrammed in FIG. 1 showing flow-chart steps 11 through 37.

In step 11 of the flow chart, a client calls the Timer Start operation, specifying a TLE for a timer to be started. The client must have assured exclusive use of the necessary resources, as by disabling timer interrupts and process switches.

In step 12, the TLE is tested to verify that it is idle.

If the TLE is not idle, then error handling is invoked in step 13, and the operation is aborted. The details of error handling are not shown.

If the TLE is idle, then execution continues with step 14, where time-out value supplied by the caller is fetched from the TLE.

In step 15, the current time value (curTime) is fetched from memory belong to the interval timing service, and the underlying hardware or lower-level timing service is used to update curTime.

In step 16, the underlying timing hardware or lower-level timing service may be accessed to ensure that the next timer interrupt occurs no later than the number of timing ticks from now specified by the time-out value.

In step 17 the index in the table (iWheel) is initialized to 0. This is to prepare for a loop in which steps 21 and 22 are executed repeatedly until a timing wheel is found that can handle the specified time-out value.

In step 21, the time-out value is compared with the maximum time-out value that can be handled by wheel [iWheel], as shown in the table of maximum time-out values.

If the time-out value is too large to be handled by the current timing wheel, then step 22 is executed, in which iWheel is incremented to select the next wheel. This is followed by another execution of step 21.

If the time-out value can be handled by the current wheel, then the loop ends by transfer to step 31.

In step 31, the expiration time (expTime) is computed by adding the current time to the time-out value.

In step 32, the resulting expiration time is stored into the TLE.

In step 33, the slot number (iSlot) is computed from the expiration time by shifting it to the right and performing a bit-wise AND with a mask. The number of bits to shift and the mask are taken from a table indexed by iWheel, the index number of the chosen timing wheel. The values are as shown in Table.

In step 34, a pointer $anchor_{13}p$ is set to the address of the list anchor for the chosen slot of the chosen timing wheel.

In step 35, the TLE is inserted into the ordered list of TLEs chained from the list anchor pointed to by $anchor_{13}p$.

In step 36, the TLE is marked as active (being timed) by turning on a bit (tleOnList) in the TLE.

In step 37, the Timer Start function returns to the caller. The timer has been started. The client may now release exclusive use of resources, such as by allowing timer interrupts and process switches.

Timer Stop

Figure 2:
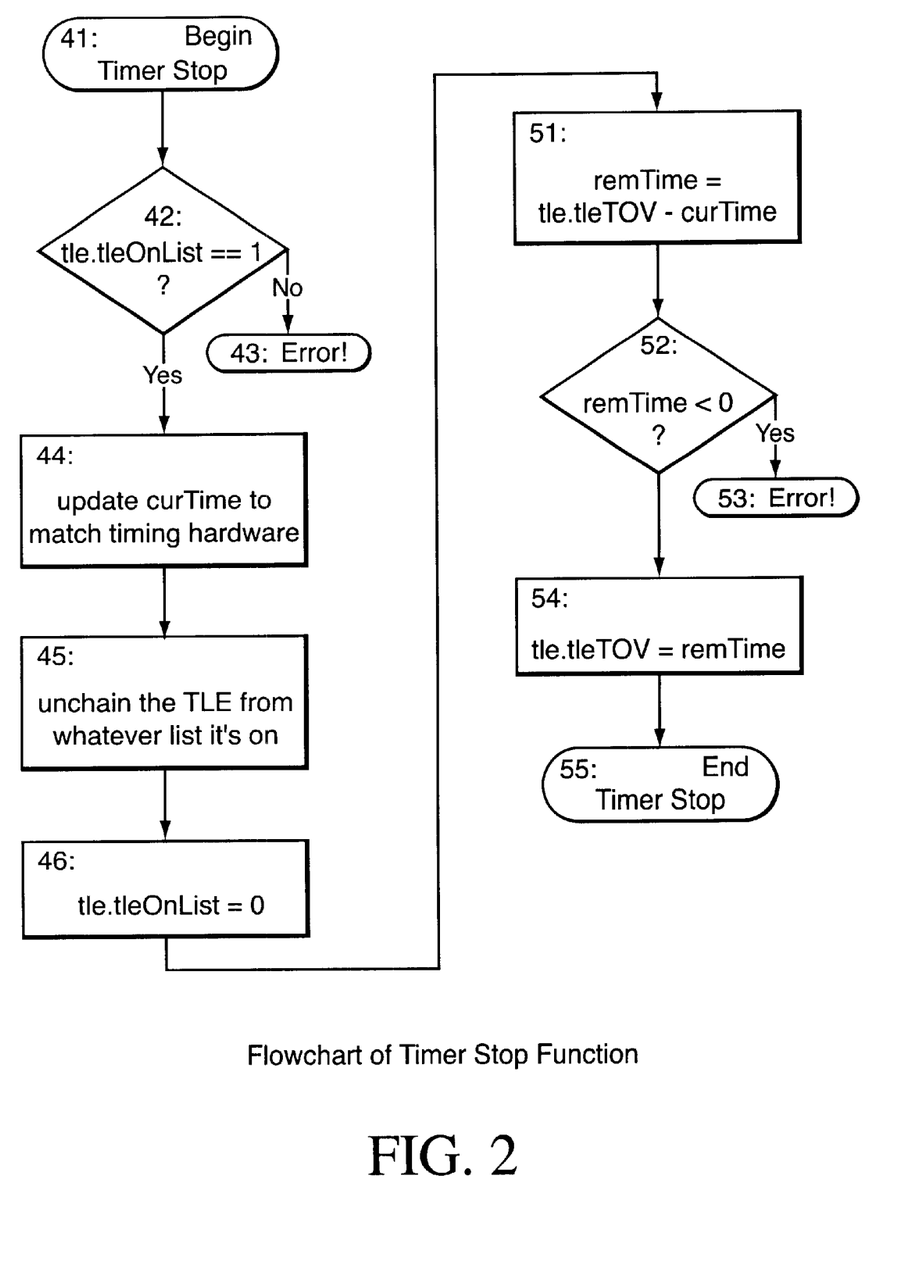
FIG. 2 illustrates steps of the Timer Stop function.

The Timer Stop function is diagrammed in FIG. 2, illustrating flow-chart steps 41 through 55.

In step 41 of the flow chart, a client calls the Timer Stop function to stop a timer. The caller specifies the address of the TLE for the timer. The client must have assured exclusive use of the necessary resources, as by disabling timer interrupts and process switches.

In step 42, the Timer Stop function examines the tleOnList bit in the TLE to verify that the timer has been started.

If the tleOnList bit is not set in the TLE, then in step 43 the Timer Stop function is aborted and error handling is performed.

If the tleOnList bit is set in the TLE, then execution proceeds normally with step 44.

In step 44, the current time (curTime) is fetched from memory, and the lower-level timing service or timing hardware is accessed in order to make the current time value is up to date.

In step 45, the TLE is unchained from whatever linked list it is on.

The linked lists are maintained as standard doubly-linked lists, in which each list element points to the next list element and to the previous list element (or to the list anchor, if there is no next element or no previous element). Because of the use of standard doubly-linked lists, it is not necessary to know what list a TLE is on in order to unchain it from the list.

The unchaining is accomplished by setting the "next" pointer in the previous TLE to the address of the next TLE after this TLE, and setting the "previous" pointer in the next TLE to the address of the TLE before this TLE. After that, the "next" and "previous" pointers in this TLE are set to a NIL pointer value (an invalid pointer value).

In step 46, the tleOnList bit in the TLE is cleared, to indicate that the timer is stopped.

In step 51, the remaining portion of the time-out value is computed by subtracting the expiration time in the tleTOV field of the TLE from the current time.

In step 52, the remaining time is checked to see if it is negative (less than zero). It isn't supposed to be possible for the remaining time to be negative, so this is done as a validity-check.

If the remaining time is negative, then step 53 performs error handling and the Timer Stop function is aborted.

If the remaining time is greater than or equal to zero, then execution continues with step 54. In step 54, the remaining time is stored in the tleTOV field of the TLE for use by the client of timing services.

In step 55, the Timer Stop function returns to the caller. The timer has been stopped. The client may now release exclusive use of resources, such as by allowing timer interrupts and process switches.

In the case where the Timer Stop function deleted the timer that was set to expire earliest, it would be possible to detect this fact and adjust the underlying timing hardware to possibly avoid an unnecessary timer interrupt. This is not currently done because an unnecessary timer interrupt is cheap, and the omission of this step doesn't result in many unnecessary timer interrupts.

Interrupt-Driven Processing

Figure 3:
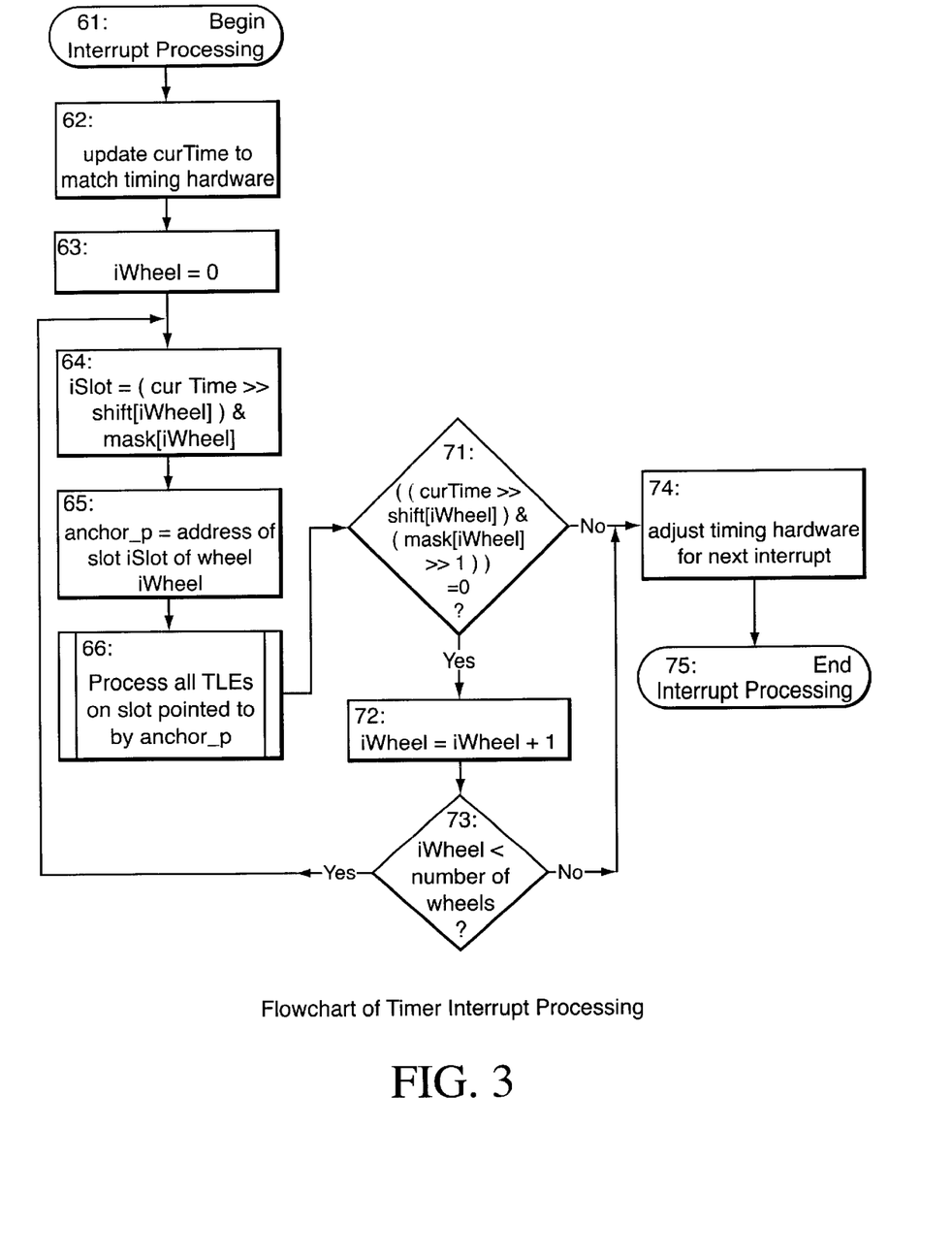
FIG. 3 shows steps in interrupt driven processing of the present invention.
Figure 4:
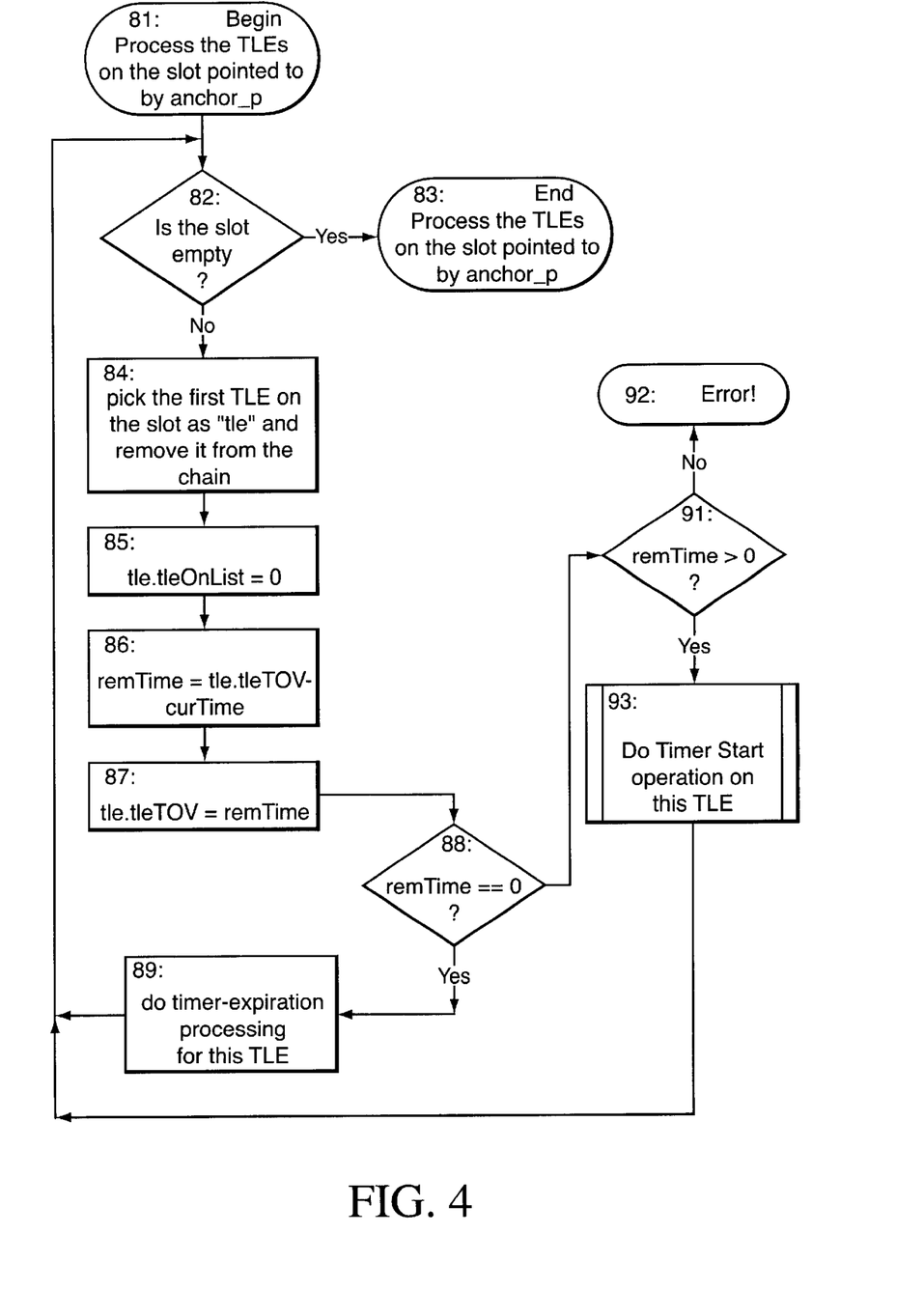
FIG. 4 shows detailed substeps of step 66 of FIG. 3.

The interrupt-driven processing is diagrammed in FIG. 3 showing flow-chart steps 61 through 75. FIG. 4 shows details of step 66 diagrammed in flow-chart steps 81 through 93.

In step 61, a timer interrupt occurs due to the action of timing hardware and lower-level timing services. Exclusive use of resources such as the timing-wheel list anchors is guaranteed by disabling other interrupt routines.

In step 62, the stored current-time value (curTime) is updated to match the time indicated by the timing hardware.

In step 63, a timing-wheel index number (iWheel) is initialized to 0 to prepare for a loop processing all the timing wheels that need processing.

In step 64, a current slot index (iSlot) is computed for the current timing wheel by shifting the current time a number of bits to the right, and then performing a bit-wise AND of the result with a bit mask. The shift count and the mask are each taken from the table of shift counts and mask values for each timing wheel. The values are as shown in Table.

In step 65, a pointer, $anchor_{13}p$, is set to the address of the slot[iSlot] of wheel[iWheel]. That, is it is set to the address of the list anchor for the chain of TLE on the current slot of the current timing wheel.

In step 66, all the TLEs on the slot pointed to by $anchor_{13}p$ are removed from the list anchor and processed, in the same order as they were inserted onto the list (in First-In-First-Out order). Each TLE is examined to see if it has expired. If so, then timer expiration processing is performed. If not, then the TLE is re-started by computing amount of time remaining for the timer, and re-invoking the Timer Start function. Details of step 66 are shown in flow-chart steps 81 through 93.

In step 71, a test is made to see if the next timing wheel after the current timing wheel is advancing at this time. The test is made by computing the value of current time shifted right and then bit-wise ANDed with a mask, where the shift count is again as given in Table, but the mask value as given in Table is shifted right by one bit before the AND operation, to reflect the fact that the timing wheel is over-built. The result is very similar to a slot number, except that its range is only half the range of iSlot computed in step 64. If the result is 0, then the next wheel needs to be processed, assuming there is a next wheel.

If the result of the computation in step 71 is zero, then execution continues with step 72. If not, execution continues with step 74.

In step 72, the wheel number, iWheel, is incremented by 1.

In step 73, the wheel number, iWheel, is compared with the number of timing wheels. If it is less than the number of timing wheels, then execution continues with step 64, so that steps 64 through 71 are repeated for another wheel. If iWheel is equal to the number of timing wheels, then all wheels have been processed, and execution continues with step 74.

In step 74, the timing hardware is set to interrupt again. The number of timer ticks before the timing hardware interrupts again is set to a value of at least 1 timer tick. The value may be increased from 1 timer tick to the lesser of (a) the number of timer ticks before the next time timing wheel [1] advances and (b) the number of timer ticks before the next time a timer is set to expire.

In step 75, the interrupt processing ends by re-enabling time-list interrupts and resuming whatever processing was interrupted.

Flow-chart step 81 marks the beginning of details of step 66 (processing of all TLE on the slot pointed to by $anchor_{13}p$).

In step 82, the list anchor is examined to see if the list is empty. The list is empty if the pointers in the list anchor point to the list anchor itself, instead of pointing to TLEs.

If the list is empty, then step 83, is reached, which marks the end of the details for step 66. That is, all the TLEs in the linked list have been processed.

If the list is not empty, then step 84 is reached, in which the "first in" element on the list is selected and removed from the linked list.

In step 85, the tleOnList bit is set to 0 to indicate that the TLE is off the list (the timer is stopped).

In step 86, the remaining time for the TLE (remTime) is computed by subtracting the current time value (curTime)

from the expiration time of the timer. The expiration time is taken from the tleTOV field of the TLE.

In step 87, the remaining time value (remTime) is stored in the tleTOV field of the TLE, replacing the expiration time.

In step 88, the remaining time value (remTime) is compared with zero. If it is exactly equal to zero, then the timer has expired, and step 89 is next performed. Otherwise, step 91 is performed next.

In step 89, the timer-expiration processing for this TLE is performed, as controlled by the tleType field of the TLE. The result may be to queue the TLE on a list of expired timers, to perform some periodic processing and re-start the timer, or any other type of processing. After step 89, this TLE has been processed, and execution continues with step 82.

In step 91, the remaining time value (remTime) is tested to see if it is greater than zero. If it is greater than zero, then execution continues with step 93. Otherwise, execution continues with step 92 (error handling).

In step 92, error handling is performed and the processing is aborted. The error handling is currently to halt the CPU so a dump can be taken. The error is that remaining time value (remTime) computed in step 86 is less than zero, and this is invalid.

In step 93, a Timer Start operation is performed on this TLE, to time the remaining unexpired portion of the timeout value for this TLE. After step 93, execution proceeds with step 82, where the slot will again be tested to see if it is empty. Note that the Timer Start operation of step 93 will never place the TLE back on the same slot as is currently being emptied.

Terminology

"interval timing" refers to timing for a specified interval of time, such as 0.5 seconds or 5 minutes.

"process running on a computer system" is a commonly-used computer term. It is generally understood to suggest that the computer system is capable of running ("executing") many programs or many instances of the same program simultaneously (as per the term "multi-processing" or "multi-programming").

"resolution" of a timer refers to the amount of time represented by one unit of time or one "timer tick." For example, in one implementation of the invention the resolution of the timer is 10 milliseconds, corresponding to an assumed "clock" that changes state or "ticks" once every 10 milliseconds (100 times per second).

"resident" memory or "permanently resident" memory refers to "real" memory in the computer, as opposed to "virtual memory" whose contents may be temporarily swapped out to disk storage or to some other type of storage that cannot be accessed as quickly as "resident" memory. (It would be possible to implement the invention using "virtual memory," but this would be inconvenient for interrupt routines, and would requiring running the code in an environment to tolerate page faults.)

"list anchor" or "chain anchor" refers to data structure in memory that is used to "chain" or "link" elements in a "list" or "queue." Many variations of chain anchor and list format are known to those skilled in the art of computer programming or of constructing computer hardware that performs equivalent functions. In one implementation of the invention, the particular variety of chain anchor employed consists of two pointers: a "backwards" or "last" pointer and a."forwards" or "next" pointer; an empty list (a slot with no timers in it) is represented by setting both pointers to the address of the anchor. The list elements (the timers, in this case) also have two pointers for keeping them linked on the list. When an element is not on a list, it contains a special "nil" value in each pointer. When an element is on a list, its "next" pointer points to the next element on the list (or to the anchor, if this is the last element on the list) and its "previous" pointer points to the previous element on the list (or to the anchor, if this is the first element on the list).

Although the invention has been described with respect to particular embodiments thereof, such embodiments are only illustrative of various aspects of the invention, the scope of which is to be determined solely by the appended claims.

What is claimed is:

1. A method, in a computer system, for scheduling an event using two or more interdependent timing wheels, each wheel having a total number of slots, a maximum timeout value, and a predetermined number of timer ticks per slot, wherein a wheel passes through a predetermined number of slots to advance a next adjacent wheel by one slot, the method comprising:

choosing a timing wheel based on the maximum timeout values of the wheels and a given timeout value for the event;

determining, based on the given timeout value for the event and a current time value, an expiration time at which time the event is to occur;

choosing one of the slots of the chosen timing wheel based on the expiration time of the event, the total number of slots of the chosen wheel, and the predetermined number of timer ticks per slot of the chosen wheel; and enqueuing the event on the chosen slot of the chosen wheel.

2. A method, in a computer system, for scheduling an event as recited in claim 1, wherein one of the wheels advances faster through its slots than another wheel, the faster advancing wheel having a smaller predetermined number of timer ticks per slot than a slower advancing wheel; and wherein the step of choosing a timing wheel based on the maximum timeout values of the wheels and a given timeout value for the event includes comparing the given timeout value for the event against the maximum timeout value of each wheel until a wheel is found that has a maximum timeout value that is greater than the given timeout value for the event and moves faster than any other wheel having a maximum timeout value that is greater than the given timeout value for the event.

3. A method, in a computer system, for scheduling an event as recited in claim 1, wherein the total number of slots for at least one wheel is a positive integer multiple of the predetermined number of slots to advance a next adjacent wheel by one slot.

4. A method, in a computer system, for scheduling an event as recited in claim 1, wherein the step of choosing one of the slots of the chosen timing wheel includes:

expressing the expiration time in timer ticks;

forming an integer quotient of the expiration time and the predetermined number of timer ticks per slot of the chosen wheel;

obtaining a remainder from an integer division of the integer quotient and the total number of slots of the chosen wheel; and taking the remainder as the number of the chosen slot of the chosen wheel.

5. A method, in a computer system, for scheduling an event as recited in claim 4, wherein the expiration time is expressed as a binary number, the total number of slots for the chosen wheel is expressed as a binary number having B bits, and the predetermined number of timer ticks per slot is expressed as a binary number having S bits;

wherein the step of forming the integer quotient of the expiration time and the predetermined number of timer ticks per slot includes the step of shifting the expiration time by S bits to the right; and wherein the step of obtaining a remainder from an integer division of the first integer quotient and the total number of slots of the chosen wheel includes the step of masking the integer quotient with a bit mask having (2^B)−1 bits.

6. A method, in a computer system, for scheduling an event as recited in claim 1, wherein an event is represented by a timer list element and each slot on each timing wheel has a list anchor that is used to maintain an ordered list of all timer list elements chained on the slot; and wherein the step of enqueuing the event on the chosen slot of the chosen wheel includes:
 inserting the timer list element into an ordered list of timer list elements chained from the list anchor; and
 marking a field in the timer list element to indicate that the inserted timer list element is active.

7. A method, in a computer system, for scheduling an event using two or more interdependent timing wheels, each wheel having a total number of slots, a maximum timeout value, and a predetermined number of timer ticks per slot, wherein a wheel passes through a predetermined number of slots to advance a next adjacent wheel by one slot, the method comprising:

choosing a timing wheel based on the maximum timeout values of the wheels and a given timeout value for the event, wherein the maximum timeout value of at least one wheel is a positive integer multiple of the time to advance a next adjacent wheel by one slot and the total number of slots of said at least one wheel is equal to the predetermined number of slots to advance a next adjacent wheel to said at least one wheel by one slot;

determining, based on the given timeout value for the event and a current time value, an expiration time at which time the event is to occur;

if the timeout value for the event is less than or equal to a time for the chosen wheel to advance the next, adjacent wheel by one slot, choosing one of the slots of the chosen timing wheel based on the expiration time of the event, the total number of slots of the chosen wheel and the predetermined number of ticks per slot of the chosen wheel;

if the timeout value for the event is more than the time for the chosen wheel to advance the next, adjacent wheel by one slot of the chosen wheel and less than the maximum timeout value of the chosen wheel, choosing one of the slots of the chosen timing wheel based on a portion of the current time value that has the same units of time as the predetermined number of ticks per slot of the chosen wheel; and enqueuing the event on the chosen slot of the chosen wheel.

8. A method, in a computer system, for scheduling an event as recited in claim 7, wherein one of the wheels advances faster through its slots than another wheel, the faster advancing wheel having a smaller predetermined number of timer ticks per slot that a slower advancing wheel; and wherein the step of choosing a timing wheel based on the maximum timeout values of the wheels and a given timeout value for the event includes comparing the given timeout value for the event against the maximum timeout value of each wheel until a wheel is found that has a maximum timeout value that is greater than the given timeout value for the event and moves faster than any other wheel having a maximum timeout value that is greater than the given timeout value for the event.

9. A method, in a computer system, for scheduling an event using two or more timing wheels as recited in claim 7, wherein the step of choosing one of the slots of the chosen timing wheel, if the timeout value for the event is less than or equal to a time for the chosen wheel to advance the next, adjacent wheel by one slot, includes:
 expressing the expiration time in timer ticks;
 forming an integer quotient of the expiration time and the predetermined number of timer ticks per slot of the chosen wheel;
 obtaining a remainder from an integer division of the integer quotient and the total number of slots of the chosen wheel; and
 taking the remainder as the number of the chosen slot of the chosen wheel.

10. A method, in a computer system, for processing at least two interdependent timing wheels, the event having a expiration time and timeout value, a wheel having a total number of slots, a maximum timeout value, and a predetermined number of timer ticks per slot, wherein a wheel passes through a predetermined number of slots to advance a next adjacent wheel by one slot, the method comprising:

after one or more timer ticks has occurred, updating a current time value;

if a timing wheel advanced based on the updated current time value,
 determining a current time slot on each advancing wheel corresponding to the updated current time value and
 dequeuing a queue of the events, if any, that are enqueued on the current time slot of each advancing wheel; and for each event that is dequeued and in the order of the event on the queue:
 marking the event as inactive;
 computing the remaining time value for the event as the difference between the current time value and the expiration time of the event;
 if the remaining time is zero, performing the event; and
 if the remaining time is greater than zero,
  choosing a timing wheel based on the maximum timeout values of the wheels and the remaining time value for the event,
  choosing one of the slots of the chosen timing wheel based on the expiration time of the event, the total number of slots of the chosen wheel, and the predetermined number of timer ticks per slot of the chosen wheel, and
  enqueuing the event on the chosen slot of the chosen wheel.

11. A method, in a computer system, for processing at least one timing wheel as recited in claim 10, wherein there are two timing wheels, the first wheel having a smaller number of timer ticks per slot and cycling faster than the second wheel; and wherein any events are dequeued from an advancing faster moving wheel before they are dequeued from an advancing slower moving wheel.

12. A method, in a computer system, for descheduling an event from a timing wheel, a wheel having a total number of slots, a maximum timeout value, and a predetermined number of timer ticks per slot, the event having a expiration time, comprising:

verifying that the event is scheduled and active;

updating a current time value;

dequeuing the event from a chosen slot of a chosen wheel on which the event was scheduled;

marking the dequeued event as inactive; and determining and saving the remaining time value of the dequeued event as the difference between the expiration time of the event and the current time.

13. A method, in a computer system, for processing at least two interdependent timing wheels, the event having a expiration time and timeout value, a wheel having a total number of slots, a maximum timeout value, and a predetermined number of timer ticks per slot, wherein a wheel passes through a predetermined number of slots to advance a next adjacent wheel by one slot, the method comprising:

after one or more timer ticks has occurred, updating a current time value;

if a timing wheel advanced based on the updated current time value, determining a current time slot on each advancing wheel corresponding to the updated current time value and dequeuing a queue of the events, if any, that are enqueued on the current time slot of each advancing wheel; and for each event that is dequeued and in the order of the event on the queue:

marking the event as inactive;

computing the remaining time value for the event as the difference between the current time value and the expiration time of the event;

if the remaining time is zero, performing the event; and if the remaining time is greater than zero, choosing a timing wheel based on the maximum timeout values of the wheels and the remaining time value for the event;

if the remaining time for the event is less than or equal to a time for the chosen wheel to advance the next, adjacent wheel by one slot, choosing one of the slots of the chosen timing wheel based on the remaining time of the event, the total number of slots of the chosen wheel and the predetermined number of ticks per slot of the chosen wheel;

if the remaining time for the event is more than the time for the chosen wheel to advance the next, adjacent wheel by one slot of the chosen wheel and less than the maximum timeout value of the chosen wheel, choosing one of the slots of the chosen timing wheel based on a portion of the current time value that has the same units of time as the predetermined number of ticks per slot of the chosen wheel; and enqueuing the event on the chosen slot of the chosen wheel.

* * * * *

UNITED STATES PATENT AND TRADEMARK OFFICE
CERTIFICATE OF CORRECTION

PATENT NO.     : 6,360,329 B1
DATED          : March 19, 2002
INVENTOR(S)    : Joseph D. Kinkade It is certified that error appears in the above-identified patent and that said Letters Patent is hereby corrected as shown below:

Column 6,
Line 12, reads "to 0, then also process the minutes wheel." it should read -- to 0, then also process the hours wheel. --
Line 17, "Table I" should be deleted;
Line 41, "Table II" should be deleted;
Line 61, insert -- Table I --;

Column 7,
Line 36, insert -- Table II --.

Column 8,
Line 24, reads "know method. The savings come partly from the fact" it should read -- known method. The savings come partly from the fact --;
Line 34, reads "wheel instead of by choosing the slowest-turing wheel for" it should read -- wheel instead of by choosing the slowest-turning wheel for --.

Column 10,
Line 4, reads "of the result by 60." it should read -- of the result divided by 60. --;
Line 8, reads "division of the result by 24. (The final step isn't always" it should read -- division of the result divided by 24. (The final step isn't always --;
Line 22, reads "minutes portion is M=(T/60 is 719. 719 mod 120 is 119, so" it should read -- minutes portion is M=(T/60) Mod 120. T60 is 719. 719 mod 120 is 119, so --;
Line 40, reads "the numeric values for finding choosing the wheel and slot" it should read -- the numeric values for finding and choosing the wheel and slot --.

Column 11,
Line 20, reads "After the timer is place on slot 58 of the minutes wheel," it should read -- After the timer is placed on slot 58 of the minutes wheel, --.

Column 12,
Line 30, reads "In Table VI, "$H_{13}$ bits refers to the number of bits handled" it should read -- In Table VI, "H_bits refs to the number of bits handled --;
Line 31, reads "by each wheel; $B_{13}$ bits refs to the number of bits each" it should read -- by each wheel; B_bits refs to the number of bits each --;
Line 49, reads "As can be seen in VI, $B_{13}$ bits is always equal to ($H_{13}$" it should read -- As can be seen in VI, B_bits is always equal to (H_ --;
Line 53, reads "sum of the $H_{13}$ bits values For example, for wheel 2, the sum" it should read -- sum of the H_bits values for the previous wheels. For example, for wheel 2, the sum --;

Page 1 of 3

UNITED STATES PATENT AND TRADEMARK OFFICE
CERTIFICATE OF CORRECTION

PATENT NO.  : 6,360,329 B1
DATED       : March 19, 2002
INVENTOR(S) : Joseph D. Kinkade It is certified that error appears in the above-identified patent and that said Letters Patent is hereby corrected as shown below:

Column 12 (cont.),
Line 54, reads "of the previous $H_{13}$ bits values is (^+%), so ticks/slot is $2^{(6+5)}$," it should read -- of the previous H_bits values is (6+5), so ticks/slot is $2^{(6+5)}$, --;
Line 55, reads "or 2 to the $_{11}^{th}$ power (2^11), or 2,048." it should read -- or 2 to the $11^{th}$ power (2^11), or 2,048. --.

Column 13,
Line 13, reads "number of consecutive b 1bits. The number of consecutive" it should read -- number of consecutive 1bits. The number of consecutive --;
Line 14, reads "1 bits is the same as $B_{13}$ bits. The mask value can also be" it should read -- 1 bits is the same as B_bits. The mask value can also be --;
Line 62, reads "as allocating a TLE from a table of TLEs." it should read -- allocating a TLE from a table of TLEs. --.
Line 53, reads "in Table." it should read -- in Table VI. --;
Line 56, reads "TLEs chained from the list anchor pointed to by anchor$_{13}$p." it should read -- TLEs chained from the list anchor pointed to by anchor_p. --.

Column 14,
Line 53, reads "In step 34 , a pointer anchor $_{13}$p is set to the address of the"; it should read -- In step 34 , a pointer anchor _p is set to the address of the --.

Column 16,
Line 6, reads "each timing wheel. The values are as shown in Table." it should read -- each timing wheel. The values are as shown in Table VII. --;
Line 7, reads "In step 65, a pointer, anchor$_{13}$p, is set to the address of the"; it should read -- In step 65, a pointer, anchor_p, is set to the address of the --;
Line 8, reads "slot[iSlot] of wheel[iWheel]. That, is it is set to the address" it should read -- slot[iSlot] of wheel[iWheel]. That is, it is set to the address --;
Line 11, reads "In step 66, all the TLEs on the slot pointed to by anchor$_{13}$p" it should read -- In step 66, all the TLEs on the slot pointed to by anchor_p --;
Line 23, reads "count is again as given in Table, but the mask value as given" it should read -- count is again as given in Table VII, but the mask value as given --;
Line 24, reads "in Table is shifted right by one bit before the AND operation." it should read -- in Table VII is shifted right by one bit before the AND operation. --;
Line 54, reads "anchor$_{13}$p)." it should read -- anchor_p). --.

UNITED STATES PATENT AND TRADEMARK OFFICE
CERTIFICATE OF CORRECTION

PATENT NO.    : 6,360,329 B1
DATED         : March 19, 2002
INVENTOR(S)   : Joseph D. Kinkade It is certified that error appears in the above-identified patent and that said Letters Patent is hereby corrected as shown below:

Column 21,
Line 4, reads "ber of timer ticks per slot, the event having a expiration time,"" it should read -- ber of timer ticks per slot, the event having an expiration time --;
Line 16, reads "least two interdependent timing wheels, the event having a" it should read -- least two interdependent timing wheels, the event having an --.

Signed and Sealed this

Eighteenth Day of February, 2003

JAMES E. ROGAN
*Director of the United States Patent and Trademark Office*